US010601025B2

United States Patent
Wang et al.

(10) Patent No.: US 10,601,025 B2
(45) Date of Patent: Mar. 24, 2020

(54) SINGLE PUNCH METHOD OF MAKING BATTERY PLATES FOR LEAD-ACID BATTERIES

(71) Applicant: Exide Technologies, LLC, Milton, GA (US)

(72) Inventors: Xiangjun Wang, Woodstock, GA (US); Hongbo Zhang, Duluth, GA (US); David Robert Mihara, Cumming, GA (US); John Harold Miller, Alpharetta, GA (US); Joel Thomas Charlton, Alpharetta, GA (US); Jimmy Lee Stewart, Woodstock, GA (US)

(73) Assignee: EXIDE TECHNOLOGIES, LLC, Milton, GA (US)

( * ) Notice: Subject to any disclaimer, the term of this patent is extended or adjusted under 35 U.S.C. 154(b) by 0 days.

(21) Appl. No.: 13/709,394

(22) Filed: Dec. 10, 2012

(65) Prior Publication Data
US 2013/0145613 A1   Jun. 13, 2013

Related U.S. Application Data

(60) Provisional application No. 61/569,816, filed on Dec. 13, 2011.

(51) Int. Cl.
*H01M 4/04* (2006.01)
*B21D 28/26* (2006.01)
(Continued)

(52) U.S. Cl.
CPC .............. *H01M 4/04* (2013.01); *B21D 28/26* (2013.01); *H01M 4/73* (2013.01); *H01M 4/742* (2013.01); *Y10T 29/49108* (2015.01)

(58) Field of Classification Search
None
See application file for complete search history.

(56) References Cited

U.S. PATENT DOCUMENTS 3,909,293 A   9/1975   Hammond et al.
3,959,016 A   5/1976   Tsuda
(Continued)

FOREIGN PATENT DOCUMENTS

CN   201500730   6/2010
JP   55096564   7/1980
(Continued)

OTHER PUBLICATIONS

International Application No. PCT/US2012/068717 International Search Report dated Mar. 1, 2013, 5 pages.
(Continued)

*Primary Examiner* — Scott J. Chmielecki
(74) *Attorney, Agent, or Firm* — Cantor Colburn LLP

(57) ABSTRACT

A method of making battery plates for lead-acid batteries includes providing a strip of material comprising lead; and punching material out of the strip to form a grid comprising wires having a non-rectangular cross-sectional shape by utilizing a die set comprising a plurality of male die components and female die components, wherein each of the male die components comprises a first portion having a first cross-sectional shape and a second portion having a second-cross sectional shape. A single punch of the material creates a hole in the material and also forms the periphery of the hole.

17 Claims, 5 Drawing Sheets

(51) Int. Cl.
*H01M 4/73* (2006.01)
*H01M 4/74* (2006.01)

(56) References Cited

U.S. PATENT DOCUMENTS

| | | | | |
|---|---|---|---|---|
| 6,557,389 | B1* | 5/2003 | Listak | B21D 13/02 |
| | | | | 72/385 |
| 7,013,699 | B1* | 3/2006 | Sperko | B21D 19/08 |
| | | | | 72/370.1 |
| 7,178,374 | B2* | 2/2007 | Enjoji | B21D 13/02 |
| | | | | 72/312 |
| 2006/0096079 | A1 | 5/2006 | Farina | |
| 2007/0193009 | A1* | 8/2007 | Vincze | B21C 37/02 |
| | | | | 29/2 |
| 2009/0223275 | A1* | 9/2009 | Hanna | B21D 37/01 |
| | | | | 72/470 |
| 2010/0095517 | A1* | 4/2010 | Yang | B21D 17/02 |
| | | | | 29/623.1 |
| 2012/0137749 | A1* | 6/2012 | Park | B21D 22/06 |
| | | | | 72/379.2 |
| 2012/0318034 | A1* | 12/2012 | Moore | B21D 22/06 |
| | | | | 72/338 |

FOREIGN PATENT DOCUMENTS

| | | |
|---|---|---|
| WO | WO0104978 | 1/2001 |
| WO | WO02054513 | 7/2002 |
| WO | WO2008109429 | 9/2008 |
| WO | WO 2008109429 A2 * | 9/2008 |

OTHER PUBLICATIONS

International Application No. PCT/US2012/068717 International Preliminary Report on Patentability and Written Opinion dated Jun. 17, 2014, 8 pages.

* cited by examiner

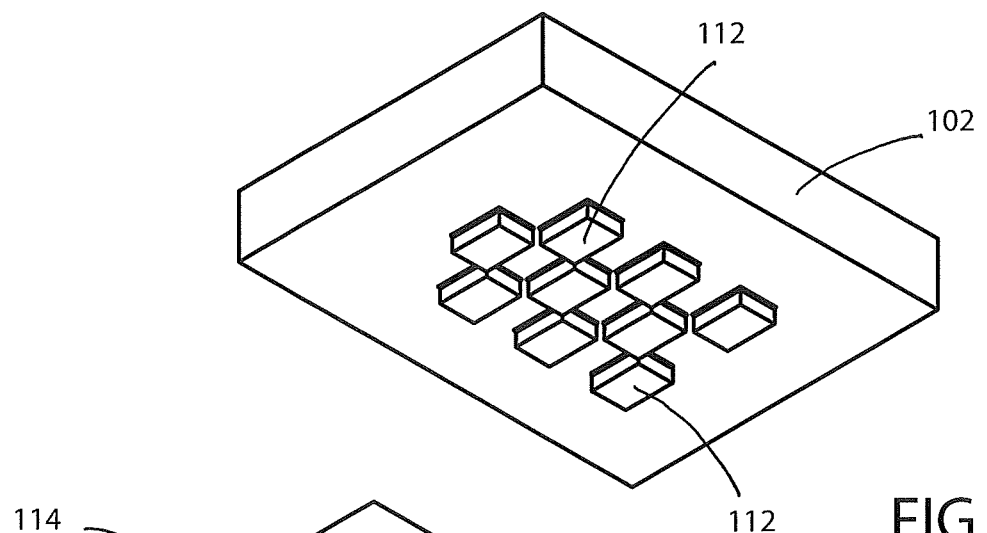
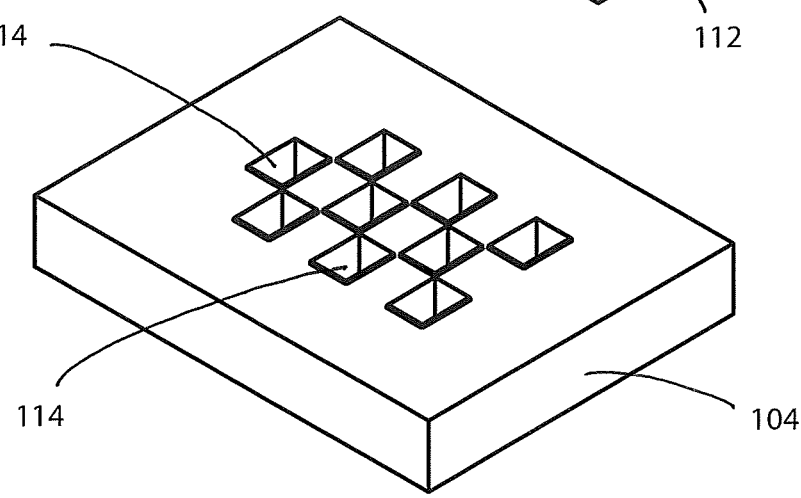
FIG. 1
FIG. 2

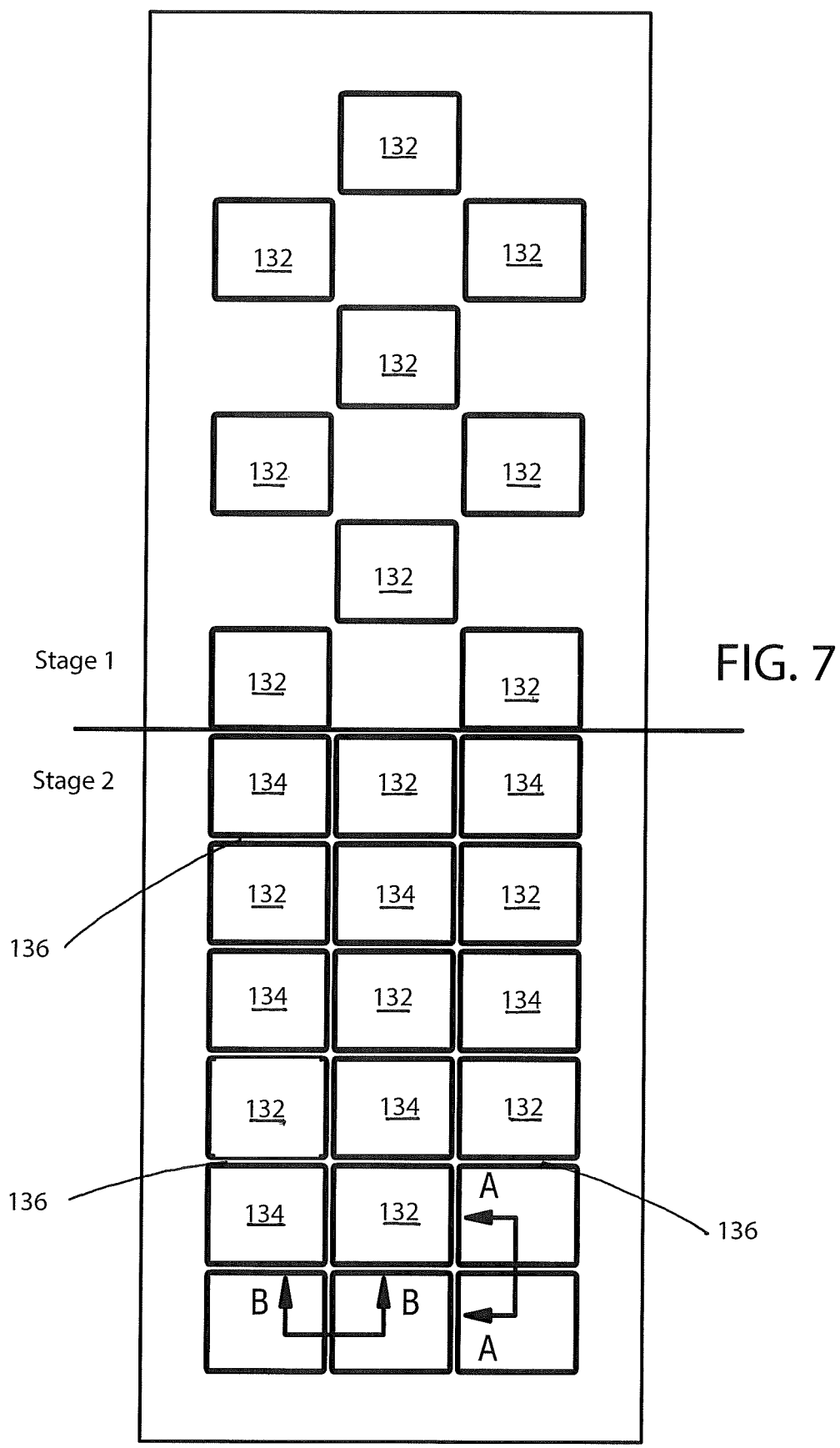

SINGLE PUNCH METHOD OF MAKING BATTERY PLATES FOR LEAD-ACID BATTERIES

CROSS REFERENCE TO RELATED APPLICATION

This application claims priority to U.S. provisional application No. 61/569,816, filed 13 Dec. 2011, entitled "A METHOD OF MAKING BATTERY PLATES FOR LEAD-ACID BATTERIES", which is entirely incorporated herein by reference.

FIELD OF THE INVENTION

The invention relates generally to methods of making battery plates for lead-acid batteries, and more particularly to methods of making battery plates for lead-acid batteries that improve paste adhesion and the service life of the batteries.

BACKGROUND OF THE INVENTION

It is well known that formation efficiency can be improved by increasing the adhesion between the paste and the grid. The increased adhesion between the grid and the paste provides for improved interfacial contact between the grid and the paste, thereby improving current flow between the grid and paste. Accordingly, certain efforts to improve battery formation efficiency have focused on improving the adhesion between the battery grids and the paste.

When applying battery paste to a grid, an oval-shaped wire such as that in a book mold cast grid allows the paste to flow around the wire. The rough surface and the sharp angle of the wires provide a mechanical graft and interlock of paste particles. Efforts have been made to create similar results of a book mold cast grid in a punched grid by performing a second operation to deform the cross-section of the wire after the punch operation. In this punch/deformation process, material is first punched from a strip of material to form a grid comprising a plurality of wires. The wires are then deformed such that the wire has a non-rectangular cross-section. While this punch/deformation process can help with paste adhesion, it requires additional equipment and additional unit operations compared to, for example, a punch process.

Accordingly, a need continues to exist for methods of punching and reforming openings in battery plates for lead-acid batteries with a single punch that improve paste adhesion.

SUMMARY OF THE INVENTION

Disclosed herein are methods of punching and reforming openings in battery plates for lead-acid batteries with a single punch that improve paste adhesion.

In one embodiment, a method of making battery plates for lead-acid batteries comprises providing a strip of material comprising lead; and punching material out of the strip to form a grid comprising wires having a non-rectangular cross-sectional shape by utilizing a die set comprising a plurality of male die components and female die components, wherein each of the male die components comprises a first cross-sectional shape in a first portion and a second-cross sectional shape in a second portion.

In one embodiment, a method of making battery plates for lead-acid batteries comprises providing a strip of material comprising lead; punching material out of the strip to form a grid comprising wires having a non-rectangular cross-sectional shape by utilizing a die set comprising a plurality of male die components and female die components, wherein each of the male die components comprises a first cross-sectional shape in a first portion and a second-cross sectional shape in a second portion, the first cross-sectional shape is generally rectangular and the second cross-sectional shape has a sloping outer surface; and applying paste to the strip.

The above-described and other features will be appreciated and understood by those skilled in the art from the following detailed description, drawings, and appended claims.

BRIEF DESCRIPTION OF THE DRAWINGS

Referring now to the figures, which are exemplary embodiments, and wherein like elements are numbered alike:

FIG. 1 is a perspective view of a punch die set of the present invention;

FIG. 2 is a cross-sectional view of the punch die set of FIG. 1;

FIG. 7 is a top view of a continuous strip of material where a first plurality of holes have been punched in a first stage, a second plurality of holes have been punched in a second stage, and where non-rectangular wire segments are formed between adjacent first and second holes.

DETAILED DESCRIPTION OF THE INVENTION

Figure 3:
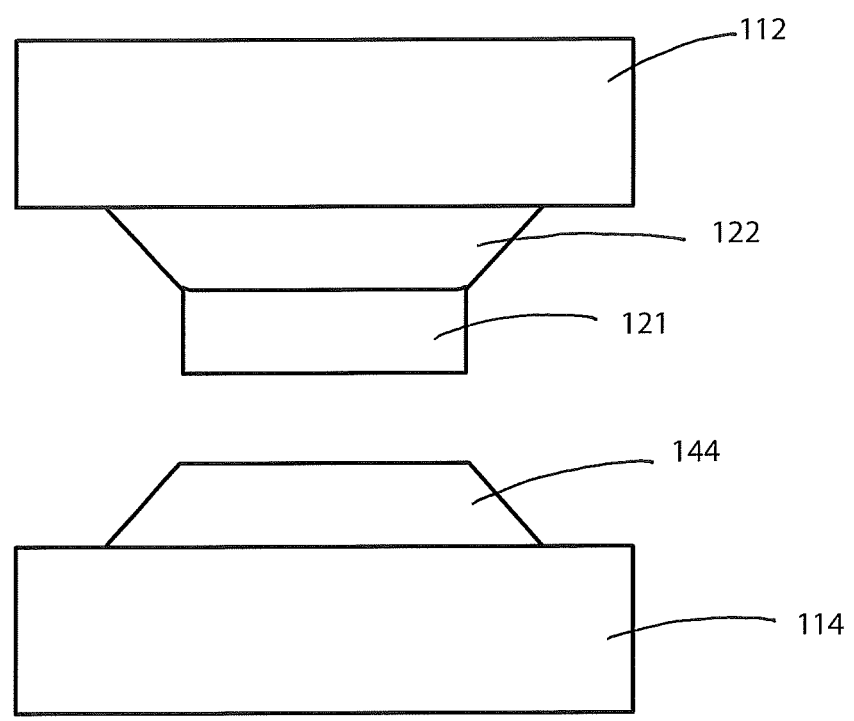
FIG. 3 is a front view of one male die component and a corresponding female die component in the open position.
Figure 4:
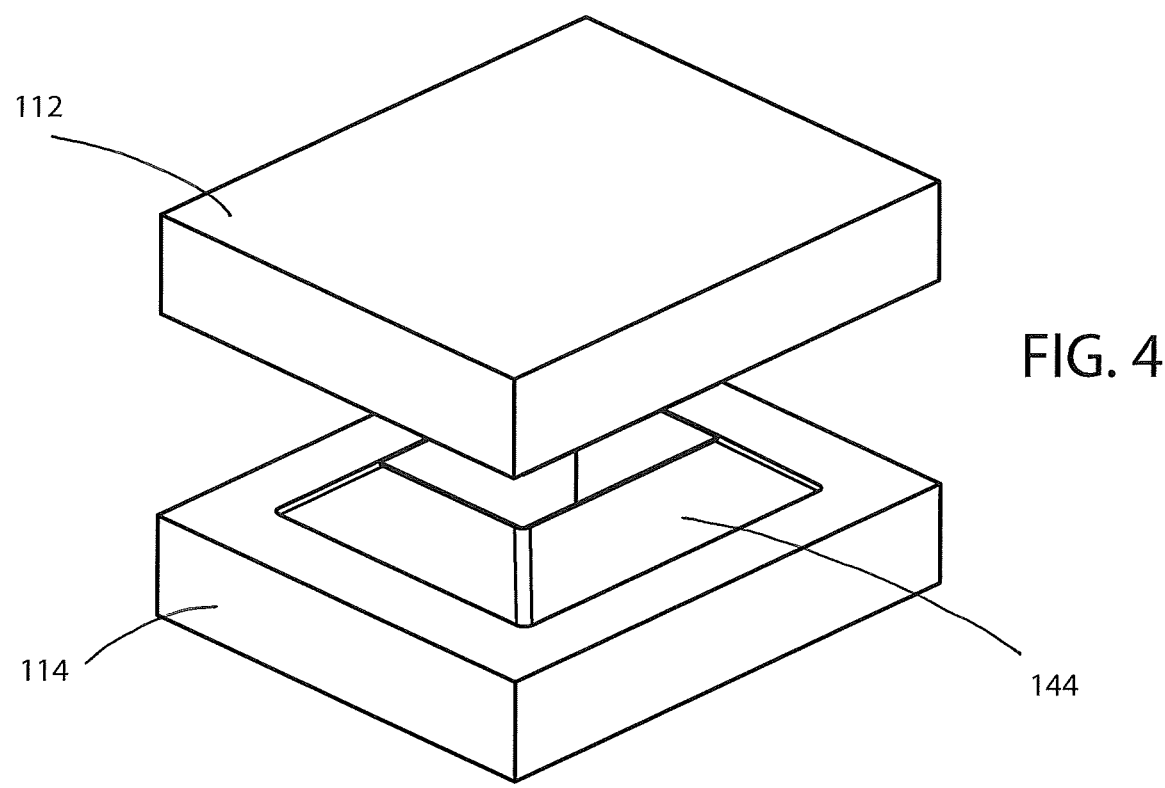
FIG. 4 is a perspective view of the male and female die components in the open position.
Figure 5:
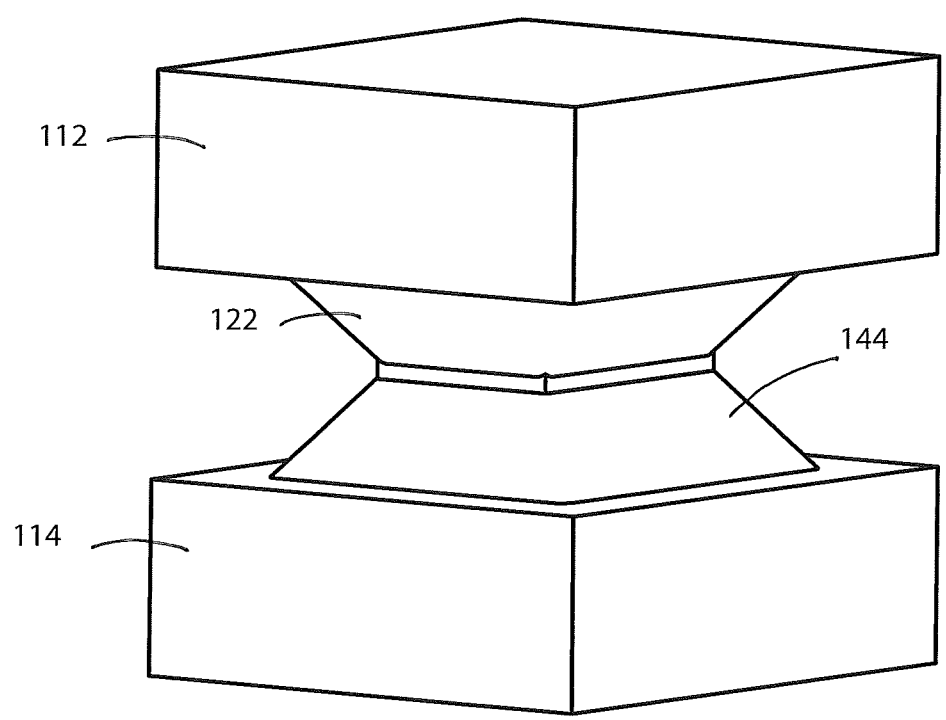
FIG. 5 is a perspective view of the male and female die components in the closed position.

Referring now to FIGS. 1-5, a punch die set generally designated as 100 is illustrated. The punch die set 100 is used to make battery grids that when pasted with active materials are used as battery plates in lead acid batteries. The upper male die portion 102 and the lower female die portion 104 of the punch die set 100 function with one another to punch and reform holes in a strip of lead that is cut into a plurality of grids. The punch die set 100 comprises a plurality of male die components 112 and female die components 114. One male die component 112 and one female die component 114 of the male and female die portions 102, 104, respectively, form one hole or opening in the grid.

Further, as is readily understood in the art, the grid pattern design varies widely depending on the application and is not intended to limit the invention disclosed herein. The punch die set 100 is advantageously used to form a non-rectangular cross sectional shape on the grid wire or segment that aids with paste adhesion. The resulting plates (when pasted and cured) can be used in any number of lead-acid batteries including, but not limited to, flooded batteries, absorbed glass mat (AGM) batteries, and gel batteries.

The male die component 112 has a first portion 121 with a first cross-sectional shape and a second portion 122 with a second cross-sectional shape. The first portion 121 of the male die component 112 cooperates with the female die component 114 to form a hole in the lead strip by punching out material. During a punch, a gap 118 is defined between opposing surfaces of the male and female die sets 112, 114 based on the thickness of the strip of material passing though the die set 100. The second portion 122 of the male die component 112 cooperates with the female die component 114 to shape the material in the gap 118 corresponding with the inner perimeter or edges of the hole. During a punch of a hole, part or all of the hole itself is substantially simultaneously shaped by the male and female die components 112, 114. In one or more embodiments, the female die component 114 may have a complementary positive or raised portion 144 to shape the side of the strip of material in the gap 118 defined between the male and female die component 112, 114.

Figure 6:
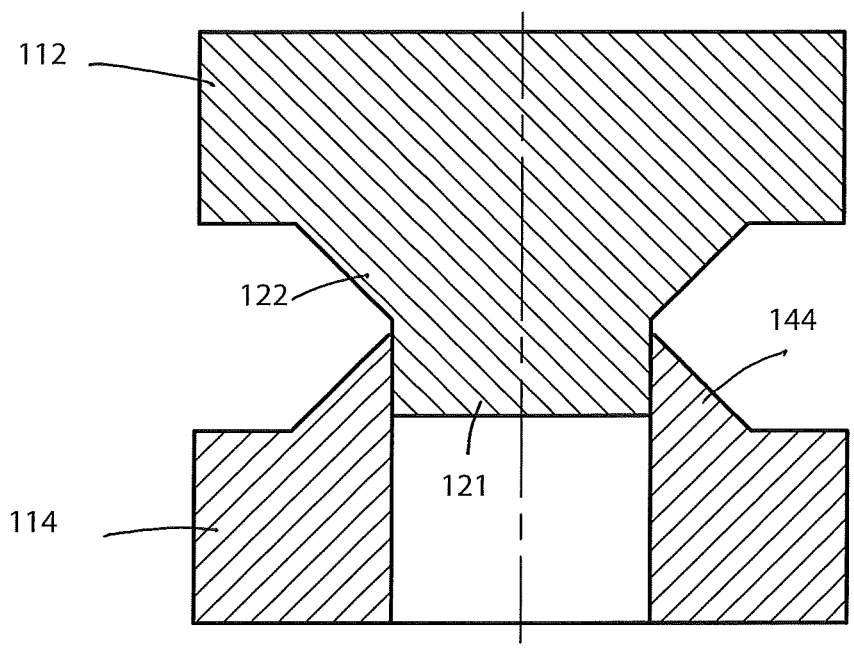
FIG. 6 is a cross-sectional view of the male and female die components in the closed position.
Figure 8A:
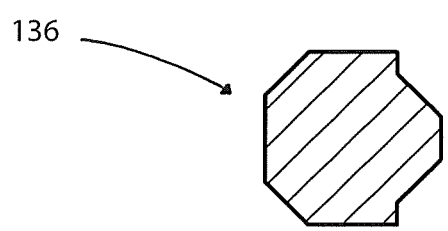
FIGS. 8A and 8B are cross-sectional views of non-rectangular wire segments taken along lines A-A and B-B, respectively.
Figure 8B:
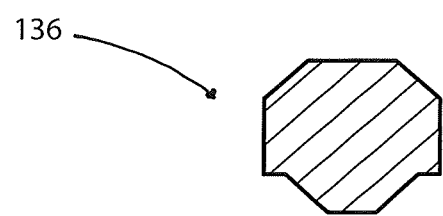

In one or more embodiments the continuous strip of lead is feed into a progressive die press having multiple stages of operation. As best shown in FIG. 6, a first plurality of holes 132 is punched into the continuous strip of lead. The first plurality of holes 132 are sufficiently spaced apart from one another so that when the other portion of the lead strip is advanced to the next stage a second plurality of holes 134 is punched such that holes 132 and holes 134 are intermixed or alternately spaced from one another. A hole 132 adjacent to a hole 134 defines a grid wire 136 there between. The shape of each grid wire 136 is formed by the shape of the gaps 118 defined between a pair of adjacent die components 112, 114. The punch die set 100, in a single step, both removes material and shapes the material to form a grid with a plurality of wires 136 having non-rectangular cross-sectional shapes.

Cross sections A-A and B-B of grid wires 136 are shown in FIGS. 7A and 7B, respectively. The cross sections A-A and B-B are the same although each of the grid wires 136 shown in FIGS. 7A and 7B are oriented differently. The cross sections are preferably the same but may be different based on the shapes of the male and female die components 112, 114. The sizes of the wires 136 may be different as well.

As illustrated in FIG. 3, for example, a grid wire 200 with a generally rectangular cross sectional shape can be formed utilizing the first portion of the die component 12. The second portion of the die component 12 can then be used to deform the rectangular cross-sectional shape into any number of cross-sectional shapes (e.g., grid wires 202 and 204 in FIG. 3). In one embodiment, the second cross-sectional shape 16 can have a sloping outer surface. The angle of the slope can vary depending on the desired application. In one embodiment, the slope is 30 degrees to 60 degrees, more particularly 30 degrees to 45 degrees. In other embodiments, the second cross-sectional shape 16 has a curvilinear outer surface.

The use of the punch die set 100 to form plates for a battery as described above constitutes an inventive method of the present invention in addition to the punch die set 100 itself. In practicing the method of punching a hole in a strip of material and forming the inner edge or perimeter of the hole with the male and female die components 112, 114 described above, the steps include providing a strip of material comprising lead, punching material out of the strip, and forming an edge to define wires having a non-rectangular cross-sectional shape. The method may also include applying paste to the punched strip. It is to be understood that additional operations may be performed between the process steps mentioned here or in addition to those steps.

The provided strip of material comprises lead, but as will be appreciated by those skilled in the art, the material can be 99.99 percent pure lead or it can be an alloy comprised of other metals. Suitable metals that can be alloyed with lead include, but are not limited to, calcium, tin, silver, and bismuth to name just a few. It is believed that the punch die set 100 works particularly well when the material is "soft." The lead alloy can have a microhardness, as measured by a Vickers hardness test, Hv value of 10 to 30. A person of skill in the art can readily determine the optimum hardness of the alloy for use in this method without undue experimentation. Additionally, it is to be noted that the strip of material may be formed by a continuous casting process or a rolling process depending on which yields the best grain structure for the particular application.

In one embodiment or more embodiments, material is punched out of the strip to form a grid comprising wires having a non-rectangular cross-sectional shape. The grids are punched to shape while maintaining a continuous strip. The grid shapes result from a progressive punching operation, i.e., features will be added to the grid through several punching operations.

The punched strip is processed to add active material (paste) and a pasting substrate (e.g., paper, glass, polymeric, etc.) to keep plates from sticking together during subsequent stacking operations. The strip is cut into individual grids. In an alternative embodiment, the punched strip can first be cut into individual grids and then processed to add active material (paste). The pasting and cutting operation is not intended to limit the disclosed invention.

Additionally, to further increase paste adhesion, the grids themselves can optionally be shot blasted to provide a desired surface roughness. In one example, the grids may be shot blasted according to any material removing or deforming process. More particularly, the grids may be shot blasted after the grid is formed but before the paste is applied. As an example, any suitable shot blasting equipment may be used to provide the controlled surface roughness on any of the grid surfaces with any suitable particles, such as particles composed of lead oxide, silica or sand, metal or glass balls, granules of silicon carbide or the like. In another example, the grids may be sprayed according to any material deposition process. More particularly, the grids may be processed according to plasma processing technology.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making battery plates for lead-acid batteries utilizing a die set having a first and second plurality of corresponding pairs of male and female die components, said method comprising the steps of:
   providing a strip of material comprising lead;
   punching material out of said strip to define a first plurality of holes in said strip with said first plurality of corresponding pairs of male and female die components;

during punching said material each of said first plurality of corresponding pairs of male and female die components also shaping, using said first plurality of corresponding pairs of male and female die components, at least a portion of a periphery of each of said plurality of first holes into a non-rectangular cross-sectional shape, the first female die component having a positive or raised portion to shape the side of the strip of material in a gap defined between the first plurality of corresponding pairs of male and female die components;

punching material out of said strip to define a second plurality of holes in said strip with said second plurality of corresponding pairs of male and female die components wherein said first and second plurality of holes are alternately spaced from one another; and during punching said material each of said second plurality of corresponding pairs of male and female die components also shaping, using said second plurality of corresponding pairs of male and female die components, at least a portion of a periphery of each of said plurality of second holes into a non-rectangular cross-sectional shape, the second female die component having a positive or raised portion to shape the side of the strip of material in a gap defined between the second plurality of corresponding pairs of male and female die components; and wherein said punching defines a plurality of shaped grid wires wherein each said grid wire is defined between adjacent said first and second holes.

2. The method of claim 1 further comprising the step of defining a grid wire between adjacent said first and second holes wherein at least a portion of one or more of said grid wires has a non-rectangular cross-sectional shape.

3. The method of claim 1 wherein said punching steps comprise a first portion of each said male die component having a first cross-sectional shape punching out a portion of said material to define said first and second holes each of which corresponds with said first cross-sectional shape.

4. The method of claim 1 wherein said punching steps comprise a second portion of each said male die component having a second cross-sectional shape forming at least said portion of said periphery of each of said first and second holes which correspond with said second cross-sectional shape.

5. The method of claim 1 wherein said punching of said material out to define said plurality of first holes and said forming of at least said portion of said periphery of each of said plurality of first holes occurs substantially simultaneously.

6. The method of claim 1 wherein said first cross-sectional shape is generally rectangular and said second cross-sectional shape has a sloping outer surface.

7. The method of claim 1 wherein said first cross-sectional shape is generally rectangular and said second cross-sectional shape is a curvilinear outer surface.

8. The method of claim 1 wherein said step of providing said strip of material comprises casting said strip of material and rolling said strip of material.

9. The method of claim 1 wherein said punching steps comprises a progressive punching operation.

10. The method of claim 1 further comprising the step of advancing said strip between punching said first and second plurality of holes.

11. The method of claim 1 further comprises the step of applying paste to said strip.

12. The method of claim 11 further comprising the step of cutting said strip to form a plurality of battery plates before said step of applying paste.

13. The method of claim 11 further comprising the step of cutting said strip to form a plurality of battery plates after said step of applying paste.

14. A plate for a lead-acid battery having a plurality of grid wires wherein at least a portion of each of said grid wires has a non-rectangular cross-sectional shape formed in accordance with the process of claim 1.

15. A method of making a battery plate for lead-acid batteries from a strip of material utilizing a die set, said method comprising the steps of:

simultaneously punching material out of the strip to define a first plurality of holes with a first plurality of corresponding pairs of male and female die components and shaping, using said first plurality of corresponding pairs of male and female die components, at least a portion of a periphery of each of said plurality of first holes into a non-rectangular cross-sectional shape, the first female die component having a positive or raised portion to shape the side of the strip of material in a gap defined between the first plurality of corresponding pairs of male and female die components;

simultaneously punching material out of the strip to define a second plurality of holes in the strip with a second plurality of corresponding pairs of male and female die components wherein said first and second plurality of holes are alternately spaced from one another and shaping, using said second plurality of corresponding pairs of male and female die components, at least a portion of a periphery of each of said plurality of second holes into a non-rectangular cross-sectional shape, the second female die component having a positive or raised portion to shape the side of the strip of material in a gap defined between the first plurality of corresponding pairs of male and female die components;

wherein said punching defines a plurality of shaped grid wires wherein each said grid wire is defined between adjacent said first and second holes; and applying paste to said plurality of grid wires.

16. The method of claim 15 wherein at least a portion of one or more of said grid wires has anon-rectangular cross-sectional shape.

17. The method of claim 15 further comprising the step of advancing the strip of material between said steps of punching said first and second plurality of holes in order to alternately space said first and second holes from one another.

* * * * *